US009001696B2

(12) United States Patent
Barabash et al.

(10) Patent No.: US 9,001,696 B2
(45) Date of Patent: Apr. 7, 2015

(54) DISTRIBUTED DYNAMIC VIRTUAL MACHINE CONFIGURATION SERVICE

(75) Inventors: Katherine Barabash, Haifa (IL); Rami Cohen, Haifa (IL); Anna Levin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 13/309,041

(22) Filed: Dec. 1, 2011

(65) Prior Publication Data
US 2013/0142079 A1    Jun. 6, 2013

(51) Int. Cl.
| | |
|---|---|
| H04L 12/28 | (2006.01) |
| G06F 9/455 | (2006.01) |
| H04L 12/24 | (2006.01) |
| G06F 9/44 | (2006.01) |
| H04L 29/12 | (2006.01) |

(52) U.S. Cl.
CPC .......... *H04L 41/0809* (2013.01); *G06F 9/4411* (2013.01); *G06F 9/45558* (2013.01); *G06F 2009/45562* (2013.01); *G06F 2009/4557* (2013.01); *G06F 2009/45595* (2013.01); *H04L 61/2015* (2013.01)

(58) Field of Classification Search
CPC .... G06F 9/441; H04L 41/22; H04N 21/4758; H04N 21/6156
USPC ................... 718/1; 370/401; 726/15; 714/27; 709/224, 203, 221, 222, 226, 227; 713/1
See application file for complete search history.

(56) References Cited

U.S. PATENT DOCUMENTS

| | | | | |
|---|---|---|---|---|
| 7,340,737 | B2 | 3/2008 | Ghercioiu et al. | 717/171 |
| 2003/0135609 | A1 | 7/2003 | Carlson et al. | 709/224 |
| 2005/0025165 | A1 | 2/2005 | Lee et al. | |
| 2008/0028071 | A1* | 1/2008 | Miyajima | 709/224 |
| 2009/0094356 | A1* | 4/2009 | Vare | 709/223 |
| 2009/0094365 | A1* | 4/2009 | Orady et al. | 709/226 |
| 2009/0210518 | A1 | 8/2009 | Verma et al. | 709/220 |
| 2010/0042707 | A1* | 2/2010 | Zhao | 709/221 |
| 2010/0082799 | A1 | 4/2010 | DeHaan et al. | 709/224 |

(Continued)

FOREIGN PATENT DOCUMENTS

| | | | | |
|---|---|---|---|---|
| EP | 2043320 A1 | 4/2009 | | H04L 29/06 |
| EP | 2216718 A1 | 8/2010 | | G06F 9/50 |

OTHER PUBLICATIONS

U.S. Appl. No. 13/107,350, filed May 2011, Barabash et al.
U.S. Appl. No. 13/107,434, filed May 2011, Barabash et al.
Droms, "Dynamic Host Configuration Protocol," Network Working Group, RFC 1531, Oct. 1993, 40 pages.

(Continued)

*Primary Examiner* — Andrew Lai
*Assistant Examiner* — Jamaal Henson
(74) *Attorney, Agent, or Firm* — VanLeeuwen & VanLeeuwen; William J. Stock

(57) ABSTRACT

An approach is provided in which a local module receives a discovery message from a virtual network endpoint that is devoid of a corresponding virtual IP address. The local module sends one or more unicast network configuration messages to a dynamic configuration service and, in turn, the local module receives one or more unicast network configuration responses from the dynamic configuration service. One of the unicast network configuration responses includes one or more network configuration parameters. The local module configures the virtual network endpoint according to one or more of the network configuration parameters.

14 Claims, 8 Drawing Sheets

(56) References Cited

U.S. PATENT DOCUMENTS

| | | | |
|---|---|---|---|
| 2011/0022694 A1* | 1/2011 | Dalal et al. | 709/222 |
| 2011/0093740 A1 | 4/2011 | Tsao | 714/4.12 |
| 2011/0093849 A1 | 4/2011 | Chawla et al. | 718/1 |
| 2011/0119382 A1* | 5/2011 | Shaw et al. | 709/226 |
| 2011/0191402 A1 | 8/2011 | Imai | 709/201 |
| 2012/0278802 A1* | 11/2012 | Nilakantan et al. | 718/1 |
| 2013/0086236 A1* | 4/2013 | Baucke et al. | 709/223 |
| 2013/0117836 A1 | 5/2013 | Shieh | |

OTHER PUBLICATIONS

Patrick, "DHCP Relay Agent Information Option," Network Working Group, RFC 3046, Jan. 2001, 15 pages.

Croft et al., "Bootstrap Protocol (BOOTP)," Network Working Group, RFC 951, Sep. 1985, 13 pages.

Office Action for U.S. Appl. No. 13/461,967 (Barabash et al., "Distributed Dynamic Virtual Machine Configuration Service," filed May 2, 2012), U.S. Patent and Trademark Office, mailed Feb. 23, 2015, 32 pages.

* cited by examiner

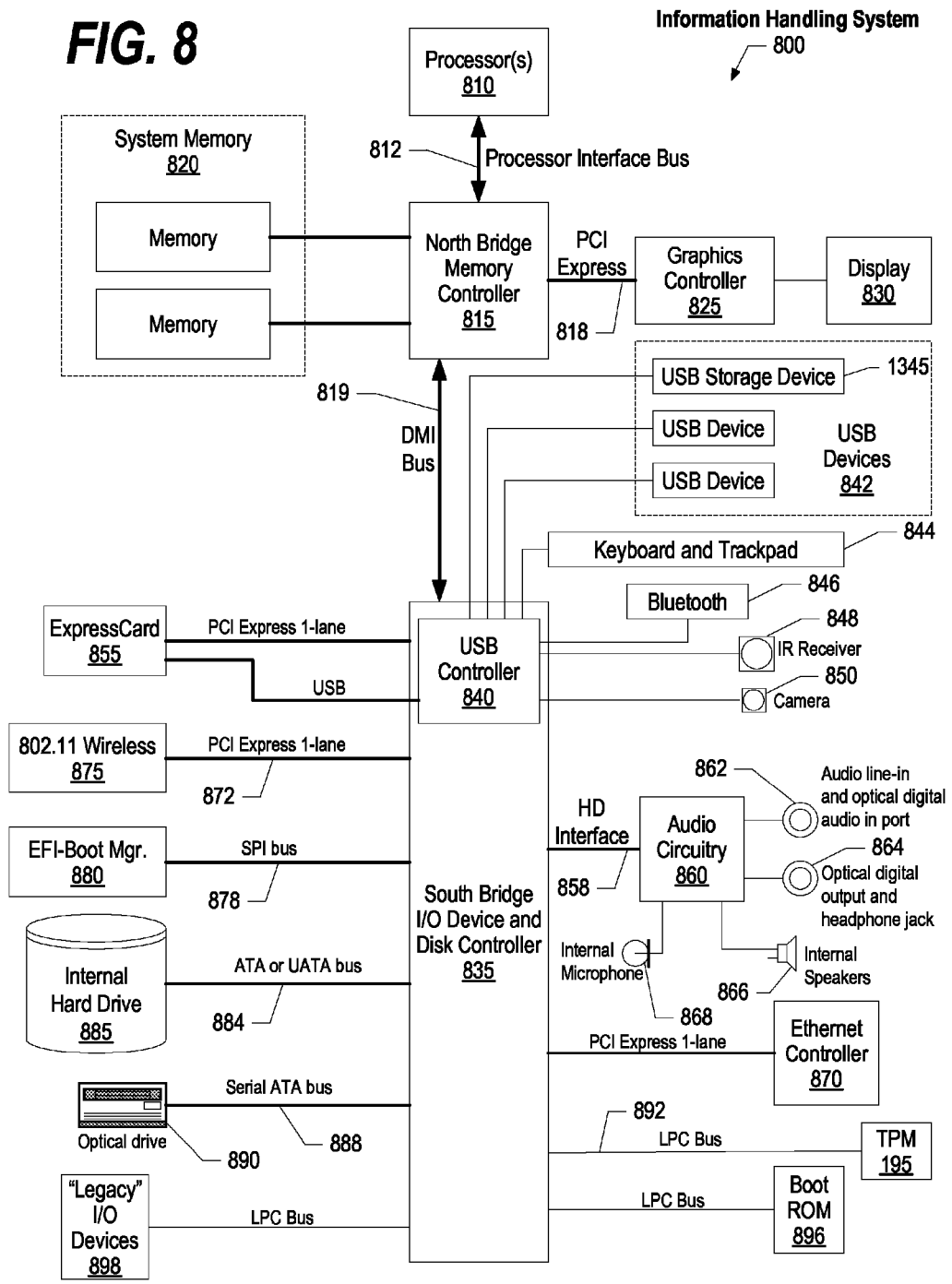

DISTRIBUTED DYNAMIC VIRTUAL MACHINE CONFIGURATION SERVICE

BACKGROUND

The present disclosure relates to a distributed dynamic virtual machine configuration system. More particularly, the present disclosure relates to assigning network configuration parameters to virtual network endpoints that are initializing.

Server virtualization technology enables hardware server consolidation and allows deployment of multiple Virtual Machines (VMs) on a single physical server. In addition, the ease of creation and movement of virtual machines enables a highly dynamic environment, which requires network support of frequent addition, removal and migration of network endpoints (virtual machines).

Most network environments today use a TCP/IP protocol suite that includes initial configuration of the host and its network environment being provided by host configuration protocols such as bootstrap protocol (BOOTP) or dynamic host configuration protocol (DHCP). The host configuration protocols provide the hosts with network configuration parameters, such as IP address, default DNS service, default gateway and others. These protocols are based on broadcasting host configuration requests through the entire network. Such broadcasting requests in a virtual data center that includes a large number of dynamic end points may overload the network and limit the network capabilities.

BRIEF SUMMARY

According to one embodiment of the present disclosure, an approach is provided in which a dynamic virtual machine configuration local module receives a discovery message from a virtual network endpoint that is devoid of a corresponding virtual IP address. The local module sends one or more unicast network configuration messages to a dynamic virtual machine configuration service and, in turn, the local module receives one or more unicast network configuration responses from the dynamic configuration service. One of the unicast network configuration responses includes network configuration parameters that the local module sends to the virtual network endpoint, which the virtual network endpoint utilizes during network configuration.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 8 provides an extension of the information handling system environment shown in FIG. 7 to illustrate that the methods described herein can be performed on a wide variety of information handling systems which operate in a networked environment.

DETAILED DESCRIPTION

Figure 1:
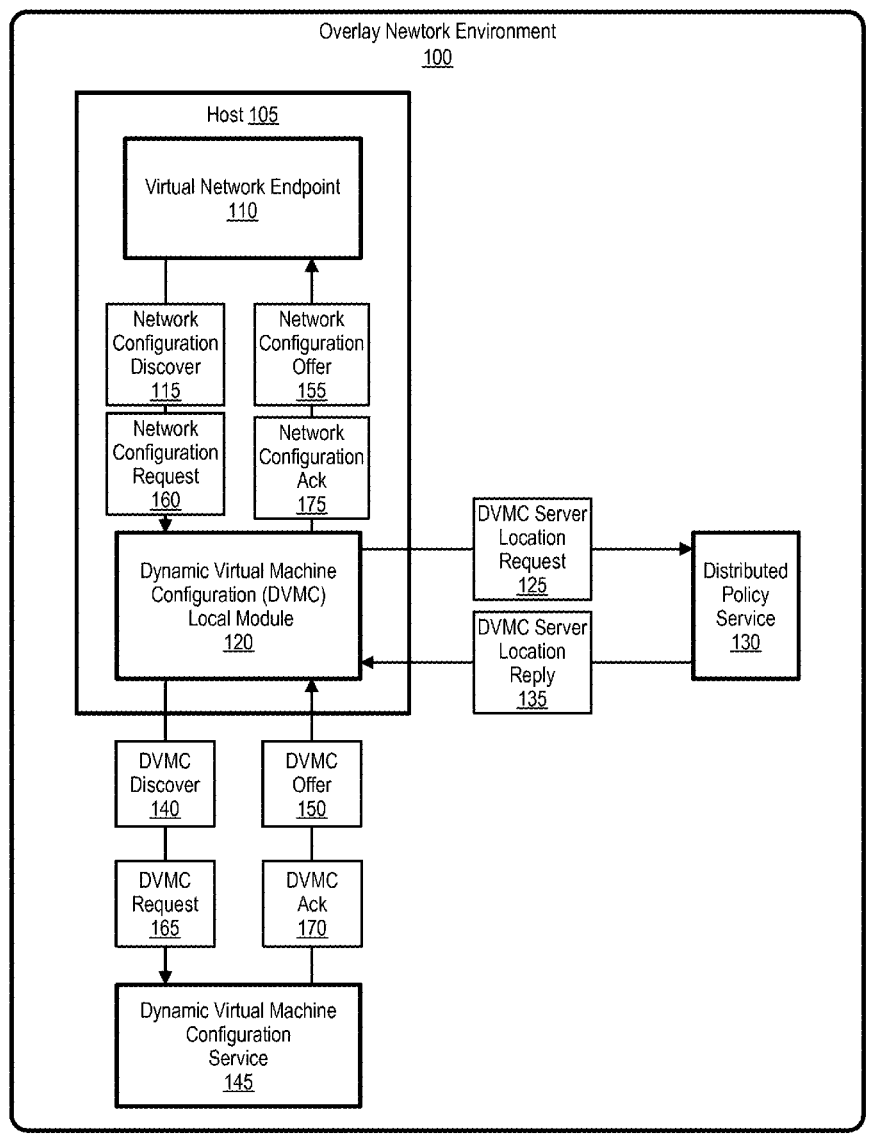
FIG. 1 is a diagram showing a dynamic virtual machine configuration module processing a network configuration discovery message initiated by a virtual network endpoint that is devoid of an assigned virtual IP address.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is a diagram showing a dynamic virtual machine configuration module that processes a network configuration discovery message initiated by a virtual network endpoint. Overlay network environment 100 supports a dynamic virtual machine configuration (DVMC) system that includes dynamic virtual machine configuration modules (module 120) located on each physical server (host 105) and a distributed hierarchical set of DVMC highly reliable servers (dynamic virtual machine configuration service 145).

Figure 5:
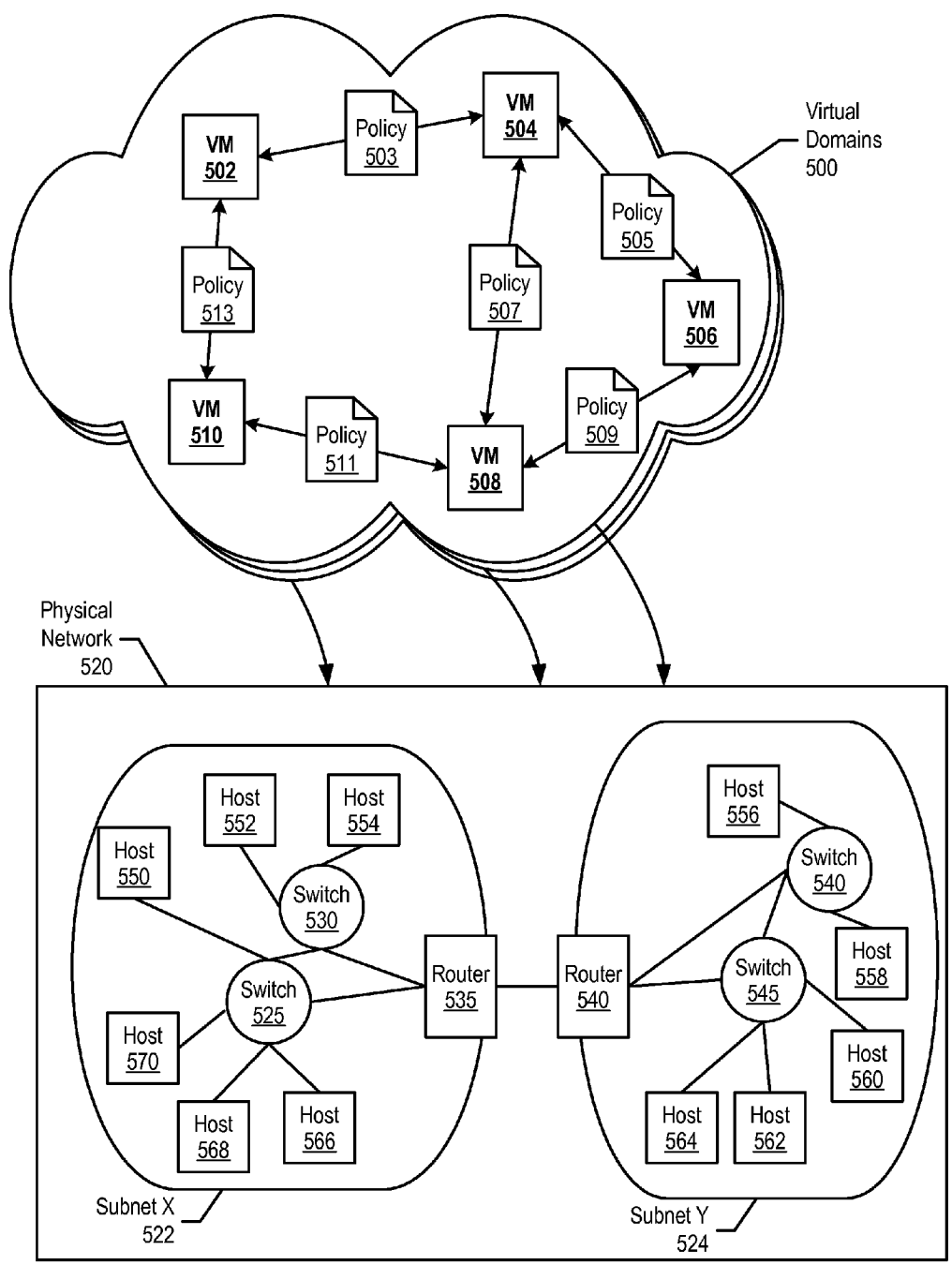
FIG. 5 is a diagram showing virtual network abstractions that are overlayed onto a physical network space.

Overlay network environment 100 includes one or more "virtual domains" that are overlayed onto a physical network (see FIG. 5 and corresponding text for further details). Virtualization is described herein as a service provided to communicating computing nodes, where communication patterns are defined and governed by policies formulated in terms and notions of a virtual nature (as opposed to a network defined in terms of cables, ports and network intermediates). As such, a virtualized system may support a large amount of virtual groups, virtual endpoints, and multiple tenants, all the while achieving independence from a physical infrastructure topology implementation.

Virtual network endpoint 110 initializes and broadcasts network configuration discover message 115, which is intercepted by dynamic virtual machine configuration local module 120. Dynamic virtual machine configuration local module 120 determines whether an address location of a corresponding dynamic virtual machine configuration server is known. In one embodiment, dynamic virtual machine configuration module 120 looks in its local cache for the IP address or a list of addresses of dynamic virtual machine configuration servers responsible for virtual network endpoint 110's dynamic network configuration. The lookup is based network properties of the virtual network endpoint that are defined in the virtual network endpoint's initial configuration file.

If the dynamic virtual machine configuration server address is unknown, dynamic virtual machine configuration module 120 sends dynamic virtual machine configuration server location request 125 to distributed policy service 130 for the address. Distributed policy service 130, in one embodiment, maintains dynamic virtual machine configuration server address locations and also maintains logical link policies in terms of physical path translations to send data packets between virtual network endpoints. In another embodiment, dynamic virtual machine configuration module 120 may correspond with a different entity (distributed or centralized) that manages configuration data for virtual domains and their corresponding dynamic virtual machine configuration server IP addresses.

Dynamic virtual machine configuration local module 120 receives dynamic virtual machine configuration server location reply 135 from distributed policy service 130, which includes a dynamic virtual machine configuration service address. In turn, dynamic virtual machine configuration module 120 identifies dynamic virtual machine configuration service 145 and sends a unicast network configuration message (dynamic virtual machine configuration discover 140) to dynamic virtual machine configuration service 145. Dynamic virtual machine configuration service 145 responds by offering network configuration parameters (e.g., virtual IP address) in dynamic virtual machine configuration offer 150 that is sent to dynamic virtual machine configuration local module 120 (see FIG. 2B and corresponding text for further details).

Dynamic virtual machine configuration local module 120 reformats the dynamic virtual machine configuration offer accordingly and sends network configuration offer 155 to virtual network endpoint 110. In turn, virtual network endpoint 110 accepts the offer and sends network configuration request 160 to dynamic virtual machine configuration local module 120. Dynamic virtual machine configuration local module 120 reformats the request accordingly and sends dynamic virtual machine configuration request 165 to dynamic virtual machine configuration service 145.

Dynamic virtual machine configuration service 145 responds by sending dynamic virtual machine configuration acknowledgement 170 to dynamic virtual machine configuration module 120. Dynamic virtual machine configuration module 120 reformats the acknowledgement and sends the reformatted acknowledgement to virtual network endpoint 110 (network configuration acknowledgement 175). In turn, virtual network endpoint 110 is configured according to the network configuration parameters.

Figure 2A:
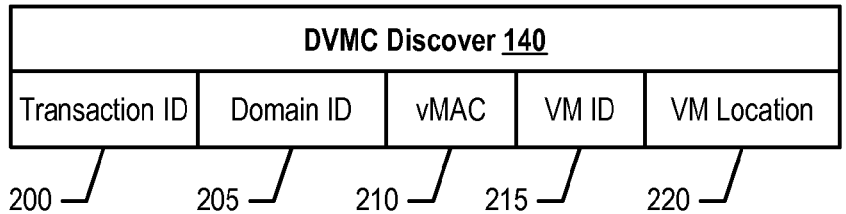
FIG. 2A is a diagram showing an embodiment of a dynamic virtual machine configuration discover message initiated by a dynamic virtual machine configuration module.

FIG. 2A is a diagram showing an embodiment of a dynamic virtual machine configuration discover message initiated by a dynamic virtual machine configuration module. Dynamic virtual machine configuration discover message 140 includes fields 200-220. Field 200 includes a transaction identifier that allows the dynamic virtual machine configuration module to track incoming and outgoing requests and responses for a particular virtual network endpoint. Field 205 includes a domain identifier that identifies the virtual network endpoint's corresponding virtual domain. Field 210 includes a virtual MAC address of the virtual network endpoint, and field 215 includes a virtual machine identifier of the virtual network endpoint relative to its corresponding virtual domain. Field 220 includes a virtual machine location that corresponds to an IP address of host 105.

Figure 2B:
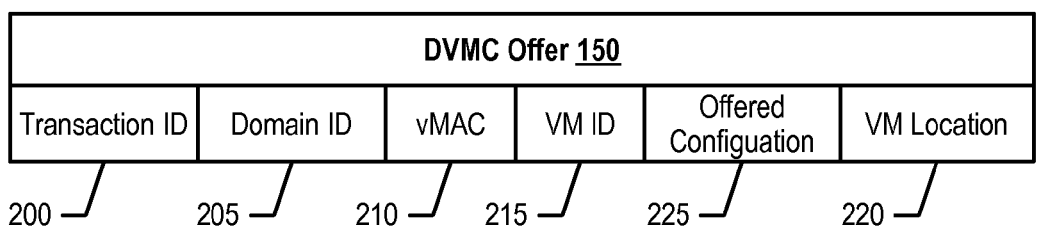
FIG. 2B is a diagram showing an embodiment of a dynamic virtual machine configuration offer message that is sent by a dynamic virtual machine configuration service and received at a dynamic virtual machine configuration module.

FIG. 2B is a diagram showing an embodiment of a dynamic virtual machine configuration offer message that is sent by a dynamic virtual machine configuration service and received at a dynamic virtual machine configuration module. Dynamic virtual machine configuration offer 150 includes fields 200-220, which includes information similar to that shown in FIG. 2A. Dynamic virtual machine configuration offer 150 also includes network configuration parameters that the dynamic virtual machine configuration service offers to the virtual network endpoint (field 225).

Figure 2C:
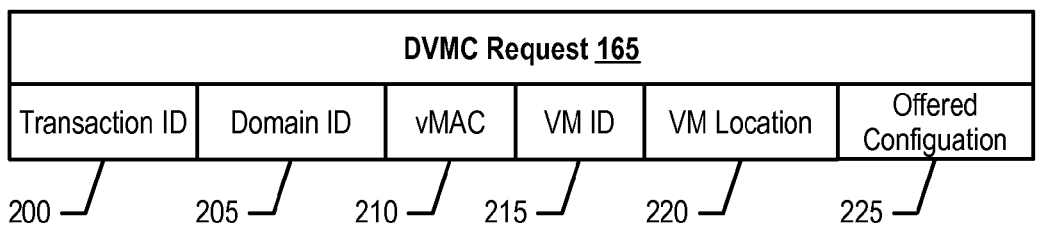
FIG. 2C is a diagram showing an embodiment of a dynamic virtual machine configuration request message that is sent by a dynamic virtual machine configuration module and received at a dynamic virtual machine configuration service.

FIG. 2C is a diagram showing an embodiment of a dynamic virtual machine configuration request message that is sent by a dynamic virtual machine configuration module and received at a dynamic virtual machine configuration service. The dynamic virtual machine configuration module sends dynamic virtual machine configuration request 165 to the dynamic virtual machine configuration service when the dynamic virtual machine configuration module wishes to accept the network configuration parameters from the dynamic virtual machine configuration service. Dynamic virtual machine configuration request includes fields 200-225, which includes information similar to that shown in FIG. 2B.

Figure 2D:
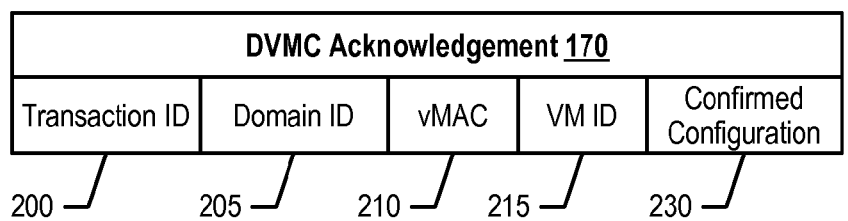
FIG. 2D is a diagram showing an embodiment of a dynamic virtual machine configuration acknowledgement message that is sent by a dynamic virtual machine configuration service and received at a dynamic virtual machine configuration module.

FIG. 2D is a diagram showing an embodiment of a dynamic virtual machine configuration acknowledgement message that is sent by a dynamic virtual machine configuration service and received at a dynamic virtual machine configuration module. The dynamic virtual machine configuration service sends dynamic virtual machine configuration acknowledgement 170 to the dynamic virtual machine configuration module to acknowledge (field 230) that the dynamic virtual machine configuration module accepted the network configuration parameters included in field 225 shown in FIG. 2C.

Figure 3:
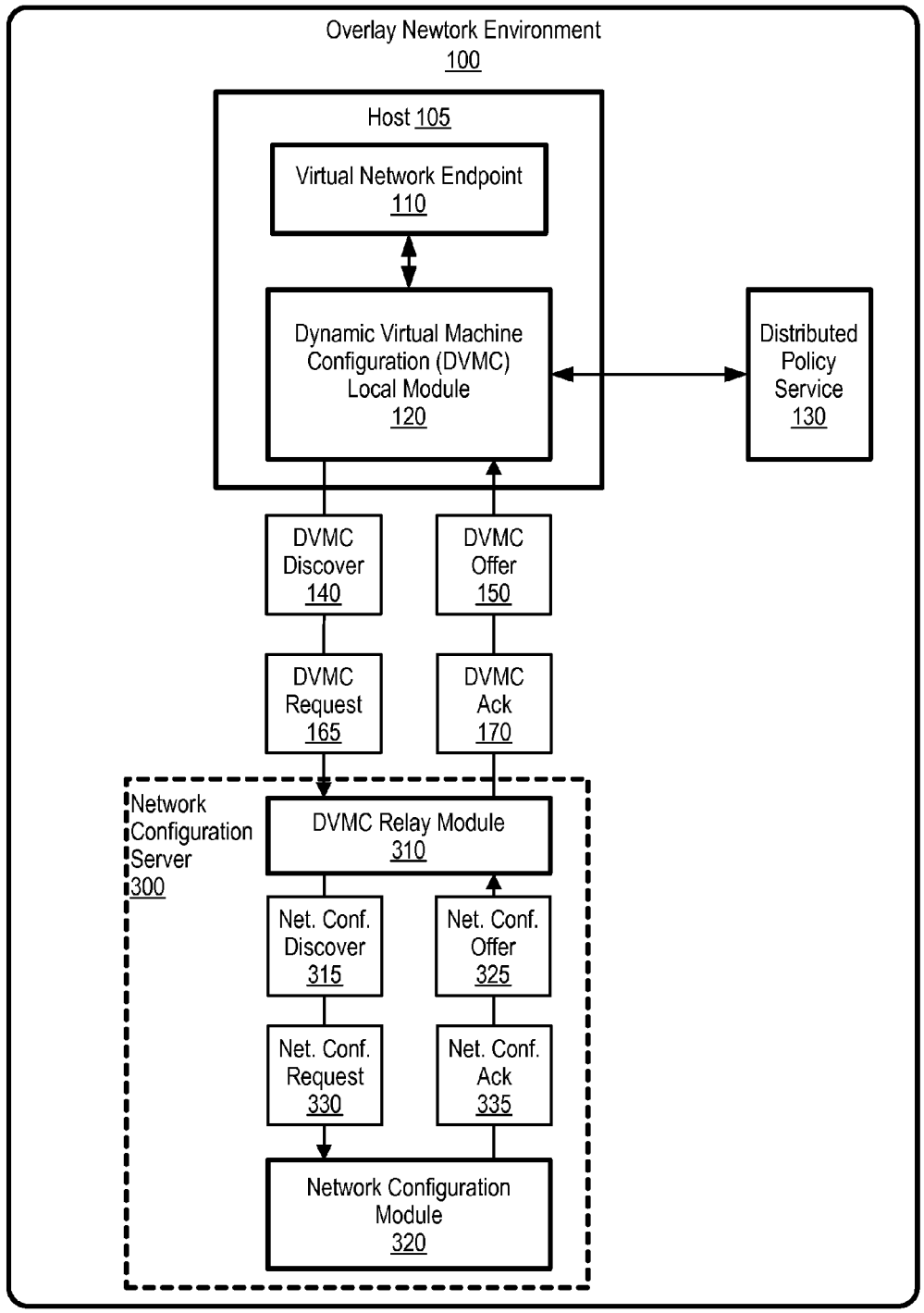
FIG. 3 is a diagram showing a dynamic virtual machine configuration module interfacing with a dynamic virtual machine configuration relay module to assign network configuration parameters to a virtual network endpoint that is devoid of a virtual IP address.

FIG. 3 is a diagram showing a dynamic virtual machine configuration local module interfacing with a dynamic virtual machine configuration relay module to assign network configuration parameters to a virtual network endpoint that is devoid of a virtual IP address. FIG. 3 is similar to FIG. 1 with the exception that dynamic virtual machine configuration relay module 310 acts a as a relay between dynamic virtual machine configuration local module 120 and network configuration module 320 during the handshaking process of assigning network configuration parameters to virtual network endpoint 110.

In one embodiment, a tenant may deploy, configure and maintain their own host configuration servers (e.g. DHCP or BOOTP servers). In this embodiment, host configuration servers may be deployed in virtual machines and dynamic virtual machine configuration relay module 310 acts as a relay for configuration requests between the host configuration servers and virtual network endpoints.

Network configuration server 300 includes dynamic virtual machine configuration relay module 310 and network configuration module 320. Dynamic virtual machine configuration module receives dynamic virtual machine configuration discover message 140 from dynamic virtual machine configuration local module 120 and relays it as network configuration discovery message 315. Likewise, dynamic virtual machine configuration relay module 310 receives network configuration offer 325 from network configuration module 320 and relays it as dynamic virtual machine configuration offer 150 to dynamic virtual machine configuration local module 120.

In turn, dynamic virtual machine configuration relay module 310 relays dynamic virtual machine configuration request 165 as network configuration request 330 and relays network configuration acknowledgement 335 as dynamic virtual machine configuration acknowledgement 175 accordingly. By utilizing dynamic virtual machine configuration relay module 310, the underlying physical infrastructure is transparent not only to the virtual network endpoints requesting network configuration, but also to user-defined host configuration servers. As such, different broadcast-based host configuration protocols may be supported, such as DHCP, BOOTP, etc.

Figure 4:
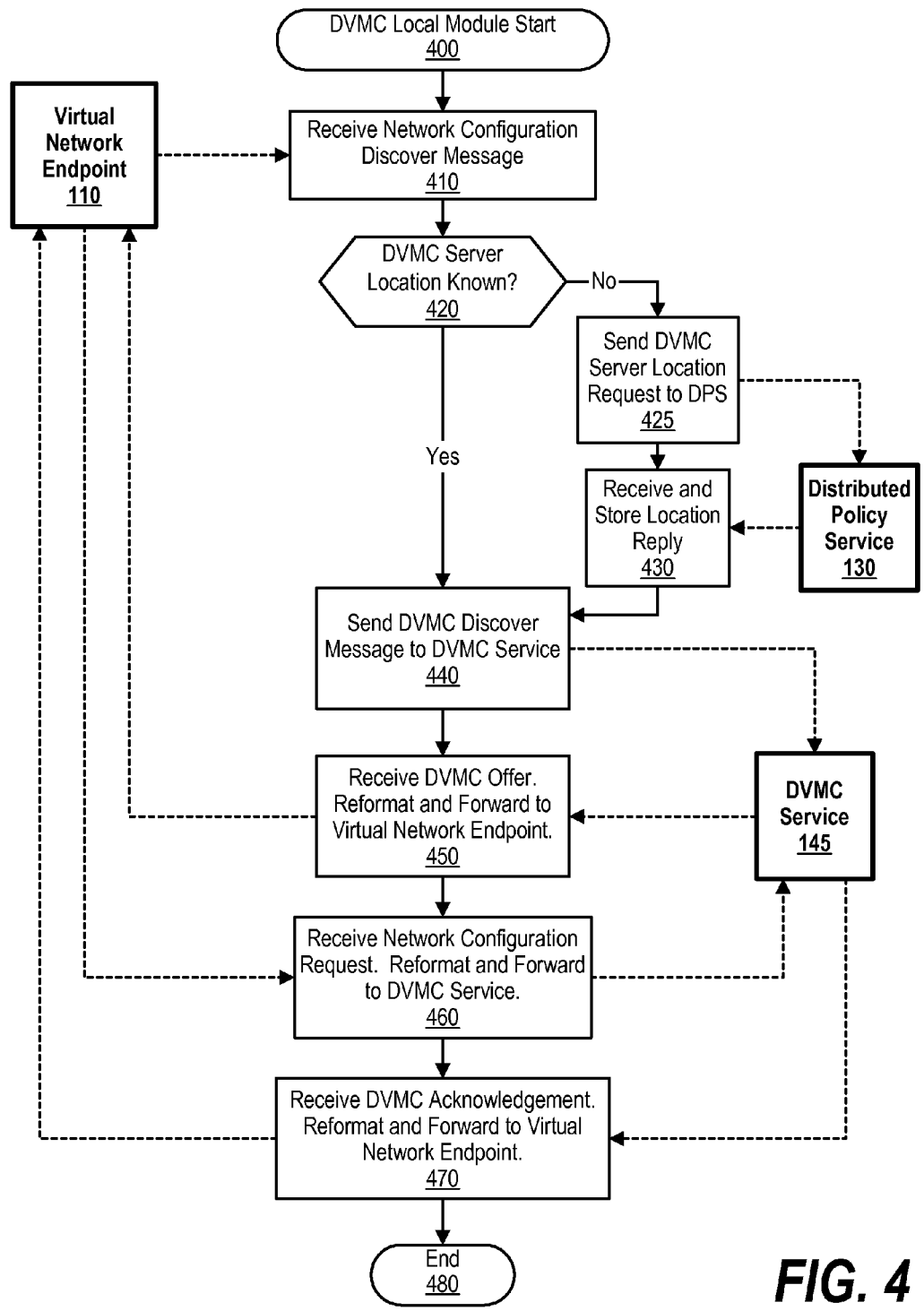
FIG. 4 is a flowchart showing steps taken in a dynamic virtual machine configuration module processing a network configuration discovery message from a virtual network endpoint that is currently devoid of an assigned virtual IP address.

FIG. 4 is a flowchart showing steps taken in a dynamic virtual machine configuration module processing a network configuration discovery message from a virtual network endpoint that is currently devoid of an assigned virtual IP address. Processing commences at 400, whereupon the dynamic virtual machine configuration module (e.g., dynamic virtual machine configuration local module 120 shown in FIG. 1) receives a network configuration discover message from virtual network endpoint 110 at step 410.

The dynamic virtual machine configuration module determines whether an address location of a corresponding dynamic virtual machine configuration server is known (decision 420). If the dynamic virtual machine configuration server address is unknown, decision 420 branches to the "No" branch, 425, whereupon the dynamic virtual machine configuration module sends a request to distributed policy service 130 for the address. At step 430, the dynamic virtual machine configuration module receives the dynamic virtual machine configuration server address location. On the other hand, if the dynamic virtual machine configuration module knows the dynamic virtual machine configuration address, decision 420 branches to the "Yes" branch, bypassing steps 425-430.

At step 440, the dynamic virtual machine configuration module sends a unicast network configuration message to dynamic virtual machine configuration service 145. In one embodiment, the dynamic virtual machine configuration module sends a dynamic virtual machine configuration discover message, such as dynamic virtual machine configuration discover 140 shown in FIG. 2A.

At step 450, the dynamic virtual machine configuration module receives a unicast network configuration response from dynamic virtual machine configuration service 130. The unicast network configuration response includes one or more network configuration parameters, such as a virtual IP address for virtual network endpoint 110. In one embodiment, the dynamic virtual machine configuration module receives a dynamic virtual machine configuration offer message such as dynamic virtual machine configuration offer 150 shown in FIG. 2B. The dynamic virtual machine configuration module reformats the dynamic virtual machine configuration offer accordingly and sends the reformatted response to virtual network endpoint 110 (e.g., network configuration offer 155 shown in FIG. 1). In another embodiment, the dynamic virtual machine configuration module reformatting process includes constructing standard host configuration request (DHCP or BOOTP) from the virtual endpoint data (e.g. vMAC) included in the DVMC discover message. The data related to overlay network management (e.g. domain ID and VM ID) may not take part in the standard host configuration request.

Next, the dynamic virtual machine configuration module receives a network configuration request from virtual network endpoint 110 in response to the network configuration offer. The dynamic virtual machine configuration module reformats the network configuration request and sends the reformatted request to dynamic virtual machine configuration service 145. At step 470, dynamic virtual machine configuration service 145 finalizes the network parameter configuration by sending a dynamic virtual machine configuration acknowledgement (e.g., dynamic virtual machine configuration acknowledgement 170 shown in FIG. 1) to the dynamic virtual machine configuration module, which is received at step 470. The dynamic virtual machine configuration module reformats the acknowledgement message and sends the reformatted acknowledgement message to virtual network endpoint 110. In turn, virtual network endpoint 110 is configured according to the network configuration parameters. Processing ends at 480.

FIG. 5 is a diagram showing virtual network abstractions that are overlayed onto a physical network space. Virtual domains 500 include policies (e.g., policies 503-513) that provide an end-to-end virtual connectivity between virtual network endpoints (e.g., virtual machines 502-510). Each of virtual domains 500 corresponds to a unique virtual domain identifier, which allows concurrent operation of multiple virtual domains over physical network 520. As those skilled in the art can appreciate, some of virtual domains 500 may include a portion of virtual machines 502-510, while other virtual domains 500 may include different virtual machines and different policies than what is shown in FIG. 5.

When a "source" virtual machine sends data to a "destination" virtual machine, a policy corresponding to the two virtual machines describes a logical path on which the data travels (e.g., through a firewall, through an accelerator, etc.). In other words, policies 503-513 define how different virtual machines communicate with each other (or with external networks). For example, a policy may define quality of service (QoS) requirements between a set of virtual machines; access controls associated with particular virtual machines; or a set of virtual or physical appliances (equipment) to traverse when sending or receiving data. In addition, some appliances may include accelerators such as compression, IP Security (IPSec), SSL, or security appliances such as a firewall or an intrusion detection system. In addition, a policy may be configured to disallow communication between the source virtual machine and the destination virtual machine.

Virtual domains 500 are logically overlayed onto physical network 520, which includes physical entities 525 through 588 (hosts, switches, and routers). While the way in which a policy is enforced in the system affects and depends on physical network 520, virtual domains 500 are more dependent upon logical descriptions in the policies. As such, multiple virtual domains 500 may be overlayed onto physical network 520. In one embodiment, physical network 520 may be divided into multiple subnets (subnet X 525 and subnet Y 530), which are joined via routers 535 and 540. Virtual domains 500 are independent of physical constraints of physical space 520 (e.g., L2 layer constraints within a subnet). Therefore, a virtual domain may include physical entities included in both subnet X 525 and subnet Y 530.

In one embodiment, the virtual network abstractions support address independence between different virtual domains 500. For example, two different virtual machines operating in two different virtual domains may have the same IP address (see FIG. 6 and corresponding text for further details). As another example, the virtual network abstractions support deploying virtual machines, which belong to the same virtual domains, onto different hosts that are located in different physical subnets (includes switches and/or routers between the physical entities). In another embodiment, virtual machines belonging to different virtual domains may be hosted on the same physical host. In yet another embodiment, the virtual network abstractions support virtual machine migration anywhere in a data center without changing the virtual machine's network address and losing its network connection. In yet another embodiment, physical network 520 supports multiple tenants and their corresponding virtual domains are maintained separately.

Figure 6:
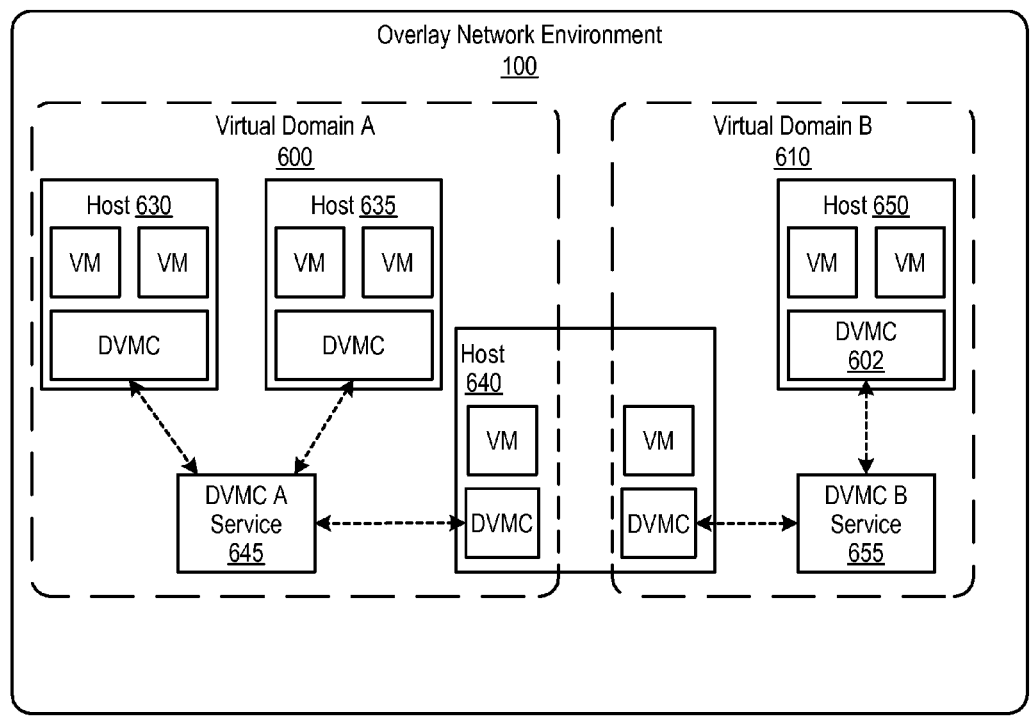
FIG. 6 is a diagram showing an overlay network environment supporting multiple virtual domains, each utilizing an independent dynamic virtual machine configuration service.

FIG. 6 is a diagram showing an overlay network environment supporting multiple virtual domains, each utilizing an independent dynamic virtual machine configuration service.

Overlay network environment 100 includes virtual domains 600 and 610 that, in one embodiment, correspond to different tenants.

Virtual domain A 600 includes virtual machines executing on hosts 630, 635, and 640. Each host includes a dynamic virtual machine configuration module that interfaces with dynamic virtual machine configuration service 645 to provide network configuration information to the respective virtual machines. Likewise, virtual domain B 610 includes virtual machines executing on hosts 640 and 650, which includes a dynamic virtual machine configuration module that interfaces with dynamic virtual machine configuration service 655 to provide network configuration information to the respective virtual machines. As can be seen, host 640 supports virtual machines and corresponding dynamic virtual machine configuration modules that reside within virtual domain A 600 and virtual domain B 610.

Figure 7:
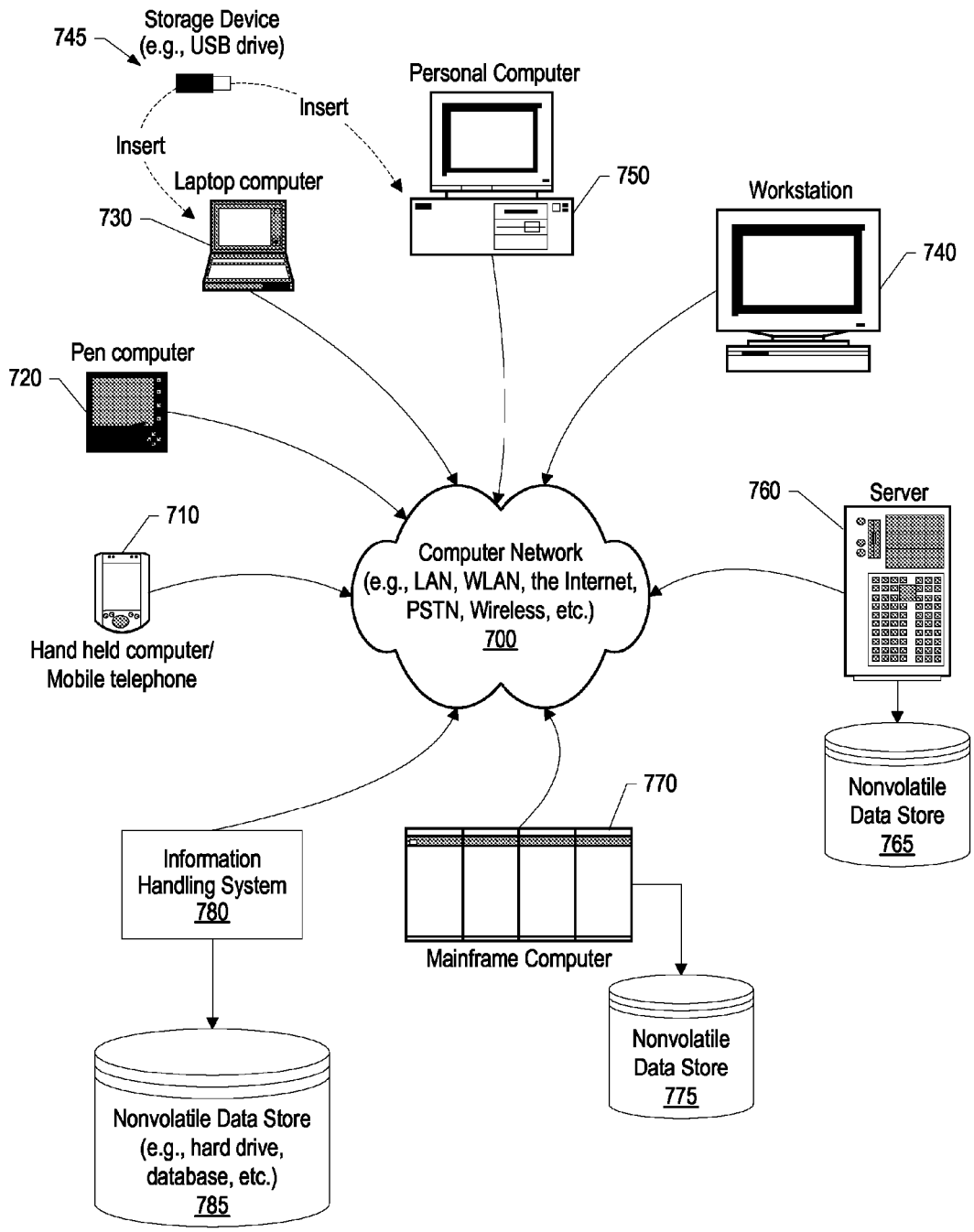
FIG. 7 is a block diagram of a data processing system in which the methods described herein can be implemented.

FIG. 7 illustrates information handling system 700, which is a simplified example of a computer system capable of performing the computing operations described herein. Information handling system 700 includes one or more processors 710 coupled to processor interface bus 712. Processor interface bus 712 connects processors 710 to Northbridge 715, which is also known as the Memory Controller Hub (MCH). Northbridge 715 connects to system memory 720 and provides a means for processor(s) 710 to access the system memory. Graphics controller 725 also connects to Northbridge 715. In one embodiment, PCI Express bus 718 connects Northbridge 715 to graphics controller 725. Graphics controller 725 connects to display device 730, such as a computer monitor.

Northbridge 715 and Southbridge 735 connect to each other using bus 719. In one embodiment, the bus is a Direct Media Interface (DMI) bus that transfers data at high speeds in each direction between Northbridge 715 and Southbridge 735. In another embodiment, a Peripheral Component Interconnect (PCI) bus connects the Northbridge and the Southbridge. Southbridge 735, also known as the I/O Controller Hub (ICH) is a chip that generally implements capabilities that operate at slower speeds than the capabilities provided by the Northbridge. Southbridge 735 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 796 and "legacy" I/O devices (using a "super I/O" chip). The "legacy" I/O devices (798) can include, for example, serial and parallel ports, keyboard, mouse, and/or a floppy disk controller. The LPC bus also connects Southbridge 735 to Trusted Platform Module (TPM) 795. Other components often included in Southbridge 735 include a Direct Memory Access (DMA) controller, a Programmable Interrupt Controller (PIC), and a storage device controller, which connects Southbridge 735 to nonvolatile storage device 785, such as a hard disk drive, using bus 784.

ExpressCard 755 is a slot that connects hot-pluggable devices to the information handling system. ExpressCard 755 supports both PCI Express and USB connectivity as it connects to Southbridge 735 using both the Universal Serial Bus (USB) the PCI Express bus. Southbridge 735 includes USB Controller 740 that provides USB connectivity to devices that connect to the USB. These devices include webcam (camera) 750, infrared (IR) receiver 748, keyboard and trackpad 744, and Bluetooth device 746, which provides for wireless personal area networks (PANs). USB Controller 740 also provides USB connectivity to other miscellaneous USB connected devices 742, such as a mouse, removable nonvolatile storage device 745, modems, network cards, ISDN connectors, fax, printers, USB hubs, and many other types of USB connected devices. While removable nonvolatile storage device 745 is shown as a USB-connected device, removable nonvolatile storage device 745 could be connected using a different interface, such as a Firewire interface, etcetera.

Wireless Local Area Network (LAN) device 775 connects to Southbridge 735 via the PCI or PCI Express bus 772. LAN device 775 typically implements one of the IEEE 802.11 standards of over-the-air modulation techniques that all use the same protocol to wireless communicate between information handling system 700 and another computer system or device. Optical storage device 790 connects to Southbridge 735 using Serial ATA (SATA) bus 788. Serial ATA adapters and devices communicate over a high-speed serial link. The Serial ATA bus also connects Southbridge 735 to other forms of storage devices, such as hard disk drives. Audio circuitry 760, such as a sound card, connects to Southbridge 735 via bus 758. Audio circuitry 760 also provides functionality such as audio line-in and optical digital audio in port 762, optical digital output and headphone jack 764, internal speakers 766, and internal microphone 768. Ethernet controller 770 connects to Southbridge 735 using a bus, such as the PCI or PCI Express bus. Ethernet controller 770 connects information handling system 700 to a computer network, such as a Local Area Network (LAN), the Internet, and other public and private computer networks.

While FIG. 7 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 795) shown in FIG. 7 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 8.

FIG. 8 provides an extension of the information handling system environment shown in FIG. 7 to illustrate that the methods described herein can be performed on a wide variety of information handling systems that operate in a networked environment. Types of information handling systems range from small handheld devices, such as handheld computer/mobile telephone 810 to large mainframe systems, such as mainframe computer 870. Examples of handheld computer 810 include personal digital assistants (PDAs), personal entertainment devices, such as MP3 players, portable televisions, and compact disc players. Other examples of information handling systems include pen, or tablet, computer 820, laptop, or notebook, computer 830, workstation 840, personal computer system 850, and server 860. Other types of information handling systems that are not individually shown in FIG. 8 are represented by information handling system 880. As shown, the various information handling systems can be networked together using computer network 800. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 8 depicts separate nonvolatile data stores (server 860 utilizes nonvolatile data store 865, mainframe computer 870 utilizes nonvolatile data store 875, and information handling system 880 utilizes nonvolatile data store 885). The nonvolatile data store can be a component that is external to the various information handling systems or can be internal to one of the information handling systems. In addition, removable nonvolatile storage device 745 can be shared among two or more information handling systems using various techniques, such as connecting the removable nonvolatile storage device 745 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An information handling system comprising:
   one or more processors;
   a memory coupled to at least one of the processors;
   a set of computer program instructions stored in the memory and executed by at least one of the processors in order to perform actions of:
   intercepting a broadcast discovery message generated by a virtual network endpoint, wherein the virtual network endpoint is devoid of a corresponding virtual IP address;
   determining, in response to accessing a local cache, that a dynamic configuration service is unknown;
   querying a distributed policy service for a location information of the dynamic configuration service in response to the determination, wherein the distributed policy service is different than the dynamic configuration service;
   receiving the location information of the dynamic configuration service from the distributed policy service;
   sending one or more unicast network configuration messages to the dynamic configuration service in response to receiving the location information of the dynamic configuration service;
   receiving one or more unicast network configuration responses from the dynamic configuration service, wherein at least one of the one or more unicast network configuration responses includes one or more network configuration parameters;
   and configuring the virtual network endpoint according to the one or more network configuration parameters.

2. The information handling system of claim 1 wherein one of the unicast network configuration messages is a dynamic virtual machine configuration discover message, and wherein the configuring further comprises assigning a virtual IP address included in the network configuration parameters to the virtual network endpoint.

3. The information handling system of claim 1 wherein the processors perform additional actions comprising:
   sending a dynamic virtual machine configuration discovery message to the dynamic configuration service;
   receiving a dynamic virtual machine configuration offer message in response to the dynamic virtual machine configuration discovery message;
   sending a dynamic virtual machine configuration request message in response to receiving the dynamic virtual machine configuration offer message; and
   receiving a dynamic virtual machine configuration reply message, wherein the dynamic virtual machine configuration reply message confirms assignment of the virtual IP address to the virtual network endpoint.

4. The information handling system of claim 1 wherein the dynamic configuration service includes a dynamic virtual machine configuration relay module and a network configuration module, the processors performing additional actions comprising:
   receiving the one or more dynamic configuration messages from the local module at the dynamic virtual machine configuration relay module;
   formatting the one or more dynamic configuration messages at the dynamic virtual machine configuration relay module and forwarding the formatted one or more dynamic configuration messages to the network configuration module;
   receiving one or more network configuration response at the dynamic virtual machine configuration relay module from the network configuration module;
   formatting the one or more network configuration responses at the dynamic virtual machine configuration relay module and forwarding the formatted one or more dynamic virtual machine configuration responses to the local module.

5. The information handling system of claim 4 wherein the network configuration module is a DHCP/BOOTP server.

6. The information handling system of claim 1 wherein the virtual network endpoint corresponds to one of a plurality of virtual domains, and wherein each of the plurality of virtual domains corresponds to an independent virtual address space and is independently managed by one of a plurality of heterogeneous tenants.

7. The information handling system of claim 6 wherein each of the plurality of virtual domains are independent of physical topology constraints of a physical network.

8. A computer program product stored in a computer readable storage medium, comprising computer program code that, when executed by an information handling system, causes the information handling system to perform actions comprising:

intercepting, at a local module, a broadcast discovery message generated by a virtual network endpoint, wherein the virtual network endpoint is devoid of a corresponding virtual IP address;

determining, in response to accessing a local cache, that a dynamic configuration service is unknown;

querying a distributed policy service for a location information of the dynamic configuration service in response to the determination, wherein the distributed policy service is different than the dynamic configuration service;

receiving the location information of the dynamic configuration service from the distributed policy service;

sending one or more unicast network configuration messages to a the dynamic configuration service in response to receiving the location information of the dynamic configuration service;

receiving one or more unicast network configuration responses from the dynamic configuration service, wherein at least one of the one or more unicast network configuration responses includes one or more network configuration parameters;

and configuring the virtual network endpoint according to the one or more network configuration parameters.

9. The computer program product of claim 8 wherein one of the unicast network configuration messages is a dynamic virtual machine configuration discover message, and wherein the configuring further comprises assigning a virtual IP address included in the network configuration parameters to the virtual network endpoint.

10. The computer program product of claim 8 wherein the information handling system performs additional actions comprising:

sending a dynamic virtual machine configuration discovery message to the dynamic configuration service;

receiving a dynamic virtual machine configuration offer message in response to the dynamic virtual machine configuration discovery message;

sending a dynamic virtual machine configuration request message in response to receiving the dynamic virtual machine configuration offer message; and receiving a dynamic virtual machine configuration reply message, wherein the dynamic virtual machine configuration reply message confirms assignment of the virtual IP address to the virtual network endpoint.

11. The computer program product of claim 8 wherein the dynamic configuration service includes a dynamic virtual machine configuration relay module and a network configuration module, the information handling system performing additional actions comprising:

receiving the one or more dynamic configuration messages from the local module at the dynamic virtual machine configuration relay module;

formatting the one or more dynamic configuration messages at the dynamic virtual machine configuration relay module and forwarding the formatted one or more dynamic configuration messages to the network configuration module;

receiving one or more network configuration response at the dynamic virtual machine configuration relay module from the network configuration module;

formatting the one or more network configuration responses at the dynamic virtual machine configuration relay module and forwarding the formatted one or more dynamic virtual machine configuration responses to the local module.

12. The computer program product of claim 11 wherein the network configuration module is a DHCP/BOOTP server.

13. The computer program product of claim 8 wherein the virtual network endpoint corresponds to one of a plurality of virtual domains, and wherein each of the plurality of virtual domains corresponds to an independent virtual address space and is independently managed by one of a plurality of heterogeneous tenants.

14. The computer program product of claim 13 wherein each of the plurality of virtual domains are independent of physical topology constraints of a physical network.

* * * * *